United States Patent
Mansfield et al.

(10) Patent No.: US 8,537,476 B2
(45) Date of Patent: Sep. 17, 2013

(54) SUPPORT SYSTEM FOR VIBRATING OPTICAL ASSEMBLY

(75) Inventors: James C. Mansfield, Hillsboro, OR (US); Baoliang Wang, Hillsboro, OR (US)

(73) Assignee: Hinds Instruments Inc., Hillsboro, OR (US)

( * ) Notice: Subject to any disclaimer, the term of this patent is extended or adjusted under 35 U.S.C. 154(b) by 391 days.

(21) Appl. No.: 12/993,206

(22) PCT Filed: Jun. 6, 2008

(86) PCT No.: PCT/US2008/066052
§ 371 (c)(1),
(2), (4) Date: Nov. 17, 2010

(87) PCT Pub. No.: WO2009/148455
PCT Pub. Date: Dec. 10, 2009

(65) Prior Publication Data
US 2011/0063707 A1    Mar. 17, 2011

(51) Int. Cl.
*G02B 7/02* (2006.01)
*F16M 13/00* (2006.01)

(52) U.S. Cl.
USPC ............. 359/811; 359/285; 359/286; 248/60; 248/560; 248/602; 248/605; 248/608; 248/609; 248/693

(58) Field of Classification Search
USPC ................... 248/60, 560, 602, 605, 608, 609, 248/693; 359/285, 286, 811
See application file for complete search history.

(56) References Cited

U.S. PATENT DOCUMENTS

| | | | |
|---|---|---|---|
| 3,867,014 A | 2/1975 | Kemp | |
| 4,559,717 A | 12/1985 | Scire | |
| 5,493,623 A | 2/1996 | Frische | |
| 5,886,810 A | 3/1999 | Siahpoushan | |
| 6,906,844 B1 | 6/2005 | Siahpoushan | |
| 2004/0232306 A1* | 11/2004 | Vatsaas et al. | 248/638 |
| 2004/0252947 A1 | 12/2004 | Liu | |
| 2008/0001055 A1* | 1/2008 | Mansfield | 248/560 |

* cited by examiner

*Primary Examiner* — Evelyn A. Lester
(74) *Attorney, Agent, or Firm* — Hancock Hughey LLP

(57) ABSTRACT

A support system for a vibrating component of an optical assembly that is adjacent to a frame, wherein the component is driven to vibrate along an X-direction of a three-dimensional Cartesian coordinate system. The support system includes a support member connected to the frame. The support system has contact elements that are adjustable for movement into and out of contact with the vibrating component to constrain motion of the vibrating component in the Y-direction and in the Z-direction, without constraining motion of the vibrating component in the X-direction.

20 Claims, 2 Drawing Sheets

SUPPORT SYSTEM FOR VIBRATING OPTICAL ASSEMBLY

FIELD OF THE INVENTION

This invention relates to a way of supporting a vibrating optical assembly.

BACKGROUND OF THE INVENTION

A photoelastic modulator (PEM) is an instrument that is used for modulating the polarization of a beam of light. A PEM employs the photoelastic effect as a principle of operation. The term "photoelastic effect" means that an optical element that is mechanically stressed and strained (deformed) exhibits birefringence that is proportional to the amount of deformation induced into the element. Birefringence means that the refractive index of the element is different for different components of a beam of polarized light.

A PEM includes an optical element, such as fused silica, that has attached to it one or more transducers for vibrating the optical element at a fixed frequency within, for example, the low-frequency, ultrasound range of about 20 kHz to 100 kHz. The mass of the element is compressed and extended as a result of the vibration. The combination of the optical element and the attached transducer(s) may be referred to as an optical assembly.

The compression and extension of the optical element imparts oscillating birefringence characteristics into the optical element. The frequency of this oscillating birefringence is determined by the size of the optical element and the speed of the transducer-generated vibration or sound wave through the material that comprises the optical element.

The effect of the oscillating birefringence of the PEM on a linear-polarized monochromatic light wave is to vary over time the phase difference between the orthogonal components of the light that propagates through the optical element. This phase difference is known as retardation or retardance and can be measured in terms of length, waves (for example, quarter-wave, half-wave), or phase angle. There are many scientific and commercial applications for which such modulated light is employed.

The optical assembly is contained within a housing or enclosure that includes an optical aperture through which the light under study is directed through the optical element. The enclosure supports the optical assembly in a manner that permits the optical element to be driven (vibrated) within the enclosure to achieve the above-noted photoelastic effect.

It is desirable to maximize the overall performance quality factor, or "Q" value, of the photoelastic modulator. In this regard, "Q" is defined as the ratio of the energy stored in a system to the energy lost per cycle. The higher the "Q," the more efficient the system.

If an optical assembly is secured in the enclosure with somewhat rigid mounting mechanisms, the effect is to dampen the vibration of the optical element, thus requiring more drive energy to maintain the desired vibration frequency of the element. Increasing drive energy increases the heat generated within the photoelastic modulator, which causes a reduction in the Q value. Nonetheless, the optical assembly must be securely supported in a manner such that, apart from the vibration of the assembly, the optical assembly remains in a fixed position relative to the enclosure and optical aperture.

Moreover, the optical assembly should be supported in a way that permits vibration of the assembly without introducing any significant stress or strain on the optical element, which would affect the oscillating birefringence characteristics of the element.

The present invention provides an effective support for a vibrating component such as the optical assembly of a PEM. The support permits free vibration of the optical assembly with a high "Q" factor. Moreover, the support described here facilitates accurate and rapid assembly of the components of the optical assembly within the enclosure.

DETAILED DESCRIPTION OF ONE EMBODIMENT

Figure 1:
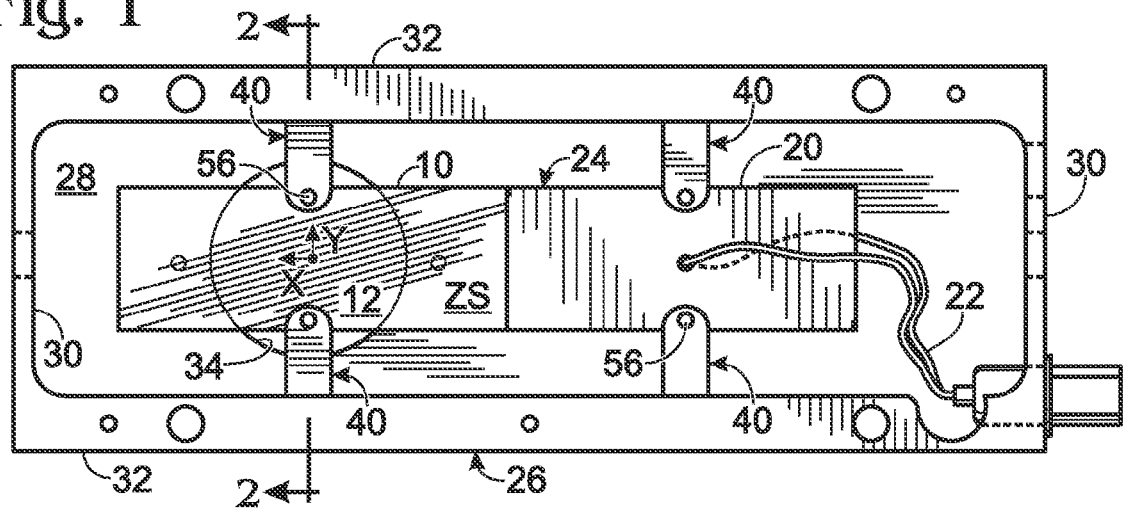
FIG. 1 is a top, plan view showing components of an optical assembly that employs an embodiment of the support system of the present invention.

FIG. 1 depicts in plan view the primary components of a photoelastic modulator, including an optical element 10 formed of fused silica. Other material, such as fused quartz, calcium fluoride, zinc selenide, silicon and others may be used to form the optical element.

The optical element 10 is an elongated bar or cuboid having an entry surface 12 through which an incident light beam is directed while the photoelastic modulator is operating. A quartz, piezoelectric transducer 20 is bonded to one end of the optical element 10. Electrical leads 22 from the transducer are connected to a driver circuit (not shown) for driving the transducer 20 to vibrate the optical element 10. The driver circuit may be tuned to drive the fused-silica element 10 to vibrate at its natural resonant frequency, typically about 50 kHz The optical element 10 and transducer 20 (hereafter collectively referred to as the optical assembly 24) are contained within a housing or enclosure 26. The enclosure 26 (FIGS. 1 and 2) includes a bottom plate 28, end walls 30, and side walls 32 that are configured in a tray shape. The end walls 30 and side walls 32 define a frame that surrounds the optical assembly. In use, a rigid, metal cover (not shown), which is substantially a mirror image of the bottom plate 28 of the enclosure is mounted to the side and end walls to enclose the space within which the optical assembly 24 is housed.

The enclosure includes an aperture 34 through which the light beam is directed to propagate through the vibrating optical element 10. The light that emanates from the element 10 is then detected and analyzed.

Figure 2:
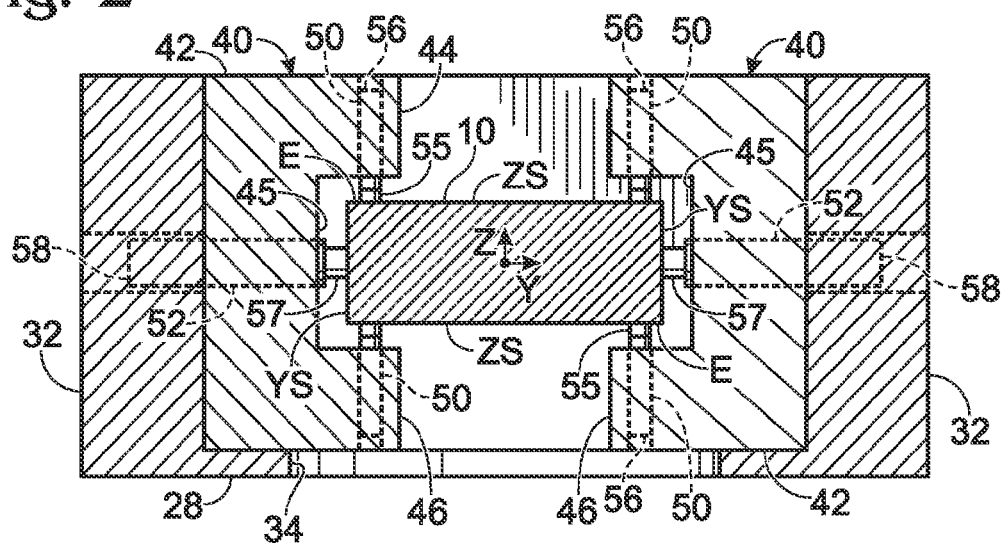
FIG. 2 is an elevation cross sectional view taken along line 2-2 of FIG. 1, such that the assembly is rotated 90 degrees.

The optical assembly 24 is supported within the enclosure so that the driven optical element 10 is free to vibrate in the manner as described above. In this regard, and in accordance with the present invention, the optical assembly 24 is supported within the enclosure by support members 40 that are connected to the side walls 32 of the enclosure, as shown in FIGS. 1 and 2 and described more fully below. The following description primarily focuses on the support members 40 as applied to the optical element 10 of the optical assembly, although the same support members 40 (as well as other designs) may be used to also support the transducer as discussed more below.

In general, the support members 40 are designed to support the optical assembly 24 in two dimensions, while leaving the optical element 10 free to vibrate in a third dimension. In this regard it is useful to consider the optical assembly as disposed in space described by a three dimensional Cartesian coordinate system having three mutually orthogonal axes conventionally labeled X, Y, and Z. For the purposes of this description, and as shown by the labeled arrows in FIGS. 1 and 2, the X-axis of the adopted coordinate system (extending left to right in FIG. 1) is parallel to the central, longitudinal axis of the optical element 10. The Y-axis is parallel to the lateral axis of the optical element (extending up and down in FIG. 1). The Z-axis appears as a line in FIG. 2 and is normal to both the X- and Y-axes.

In describing the present invention it will be useful to correlate surfaces of the optical assembly 10 to the coordinate system. To this end, the cuboidal optical assembly 10 includes two planar, parallel Z surfaces "ZS" that reside in planes that are perpendicular to the Z-direction, and two planar, parallel Y surfaces "YS" that reside in planes that are perpendicular to the Y-direction.

Each support member 40 includes a base 42 (FIG. 2) which is formed with or affixed to a side wall 32 of the enclosure. The base 42 projects inwardly, toward the optical element 10 and is generally "C" shaped such that a groove 45 is defined between opposing legs 44, 46 of the body. Each lateral side of the optical element 10 fits within the groove 45, the groove being sized such that there is a gap between the optical element 10 and the base 42 of the support members 40.

In a preferred embodiment, there are carried in each base 42, three contact elements. Two of these are Z contact elements 50, referred to as a Z contacts, and the other is a Y contact element 52 or Y contact.

Each Z contact 50 is an elongated member that is threaded into the base 42. Specifically, on each side of the optical element one Z contact 50 is threaded into a leg 44 of the base and another Z contact 50 is threaded into the opposing leg 46 so that the two Z contacts 50 are axially aligned, facing one another with the side edge of the optical element 10 between them. One end of each Z contact 50 includes a contact end 55 affixed thereto that contacts the optical element 10. The contact end 55 is preferably non-metallic, and may be, for example, an engineered plastic or polymer such as that sold by DuPont, under the trademark "Delrin."

The end 56 of the Z contact 50 that is opposite the contact end 55 is exposed within the threaded aperture in which the Z contact 50 is threaded. That end 56 is provided with a hexagonal recess or similar configuration for receiving the tip of a rotatable driving tool for rotating the threaded Z contact 50, thereby moving the element relative to the base 42 for advancing or retracting the contact end 55 of Z contact 50 toward and away from the optical element 10.

The sectional view of FIG. 2 depicts four Z-contacts 50, two in each of the two opposed, spaced apart support members 40. The Z-contacts 50 are extended across the gap between the support base 42 and the optical element 10 such that each contact end 55 engages an adjacent Z-surface ZS of the optical element near, but slightly spaced from the edge "E" (FIG. 2) of the optical element that is defined by the junction of the Z-surface ZS and Y-surface YS of the cuboidal optical element.

Each opposed pair of Z-contacts 50 are extended by an amount such that the contact ends 55 just contact the Z surface ZS without inducing pressure in (squeezing) the optical element 10 between them. The avoidance of such squeezing when adjusting the support members, and thus the avoidance of the undesirable stress-induced birefringence as discussed above, may be accomplished by advancing the Z contacts toward the optical element 10 until resistance is detected, such resistance indicating contact between the Z surface ZS of the optical element 10 and the contact end 55 of the Z contact 50. Once the resistance is detected, the Z-contact is preferably retracted by a very slight amount to account for any unnecessary pressure that may have been generated as the contact end 55 first engaged the surface ZS. It is noteworthy that the contact end 55 merely abuts the optical element surface, and no adhesive material is applied between the end 55 and surface.

It will be appreciated that so mounted between the Z contacts 50, the optical element 10 is constrained against movement in the Z-direction (that is, parallel to the Z axis). It will also be appreciated that the precise, controlled movement of the Z contacts enables one to precisely support the optical element 10 without unwanted pressure between opposing Z contacts. Also, because of the precise adjustability of the space between the Z contacts, a number of optical elements of different thicknesses may be supported by a single support system of the present invention.

To complete the present embodiment of the support system, the above-mentioned opposed pair of Y contacts 52 are provided. The Y contacts 52 are threaded into the base 42 of the support member 40 in the base portion between the two legs 44, 46 and extend in the Y-direction, as shown in FIG. 2.

One end of each Y contact 52 includes a contact end 57 affixed thereto that contacts the optical element 10. The contact end 57 is non-metallic, and preferably made of material corresponding to that described above in connection with the ends 55 of the Z contacts 50.

The end 58 of the Y contact 52 that is opposite the contact end 57 is exposed within the threaded aperture in which the Y contact 52 is threaded. That end 58 is provided with a hexagonal recess or similar configuration for receiving the tip of a rotatable driving tool for rotating the threaded Y contact, thereby moving that contact relative to the base 42 for advancing or retracting the contact end 57 of Y contact 52 toward and away from the Y surface YS of the optical element 10.

The Y contacts 52 are similar to a pair of opposed Z contacts 50 in that each opposed, axially aligned pair of Y contacts 52 are extended by an amount such that the contact ends 57 just contact the Y surface YS without inducing pressure (squeezing) the optical element between them. The avoidance of such squeezing and thus the avoidance of the undesirable stress-induced birefringence, discussed above, may be accomplished in the same manner as described above in connection with the adjustment of the Z contacts 50. It will also be appreciated that the precise, controlled movement of the Y contacts 52 enables one to precisely support the optical element without unwanted pressure between opposing Y contacts.

In summary, the Z contacts 50 and Y contacts 52 support the optical element 10 in a manner that constrains motion of the vibrating component in the Y-direction and in the Z-direction, without constraining motion of the vibrating component in the X-direction.

The shape of the contact ends 55, 57 (that is, the part of the contact element 50, 52 that contacts the surface of the optical element) although depicted as flat in the figures, may have other shapes. For example, the contact ends 55, 57 may be rounded or somewhat knife-edged. It is generally preferred that the surface area of the contact end engaging the surface of the optical element be minimized so that, while still adequately supporting the optical element 10, the above discussed efficiency or "Q" value of the photoelastic modulator is correspondingly improved.

Figure 3:
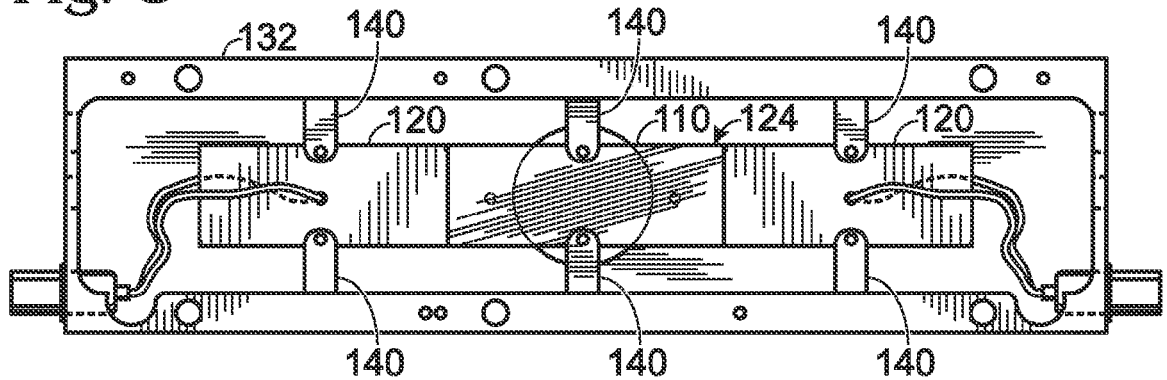
FIG. 3 is a top, plan view showing components of an alternative optical assembly that employs an embodiment of the support system of the present invention.

FIG. 3 illustrates another version of an optical assembly 124 where an optical element 110 is bonded between two transducers 120. Each transducer 120 as well as the optical element 110 is supported with a pair of opposed support member 140, which match the support members 40 described above, and extend between the side walls 132 and the optical element 124. It is contemplated that, in this embodiment, the support provided by the support members 140 that engage the transducers 120 will suffice to support the overall assembly without the need for the pair of support members 140 that are depicted as engaging the optical element 110 in FIG. 3.

Specifically, the support members 40, 140 of the present invention are sufficiently versatile to perform two related, but different functions. That is, in addition to the highly efficient support function discussed above in connection with the optical element 10, the same support member, when applied to the transducer component 20, 120 of the optical assembly can serve as a clamp to securely hold the transducer in place. In this regard, pressure can be applied to the transducer without inducing birefringence into the attached optical element. Consequently, the contact elements associated with the support members 40, 140 that engage the transducer can be advanced by an amount that results in squeezing the transducer between opposing contact elements to securely hold or "clamp" the transducer in place. It will be understood that the clamping pressure generated by the support member on the transducer as just described is quite unlike the slight contact provided by the same members when applied to the optical element.

Figure 4:
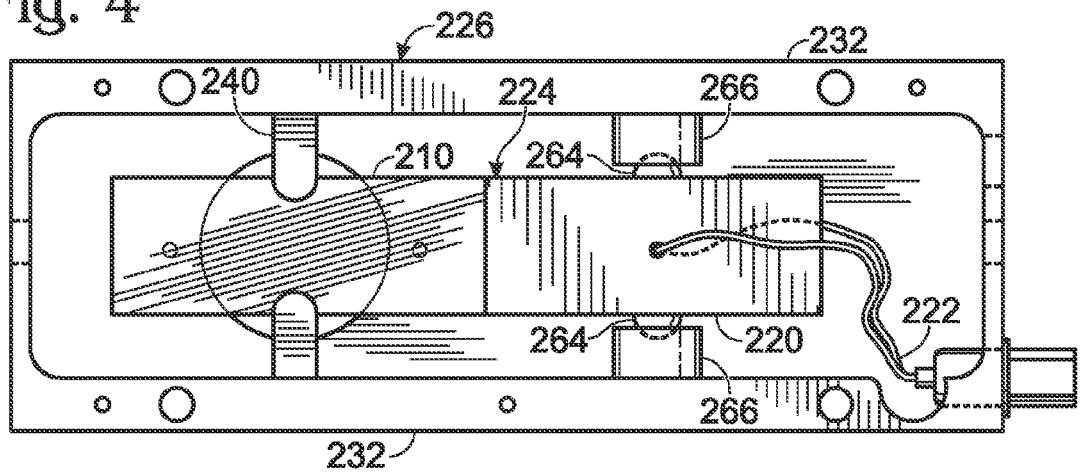
FIG. 4 is a top, plan view showing components of an optical assembly that employs an alternative embodiment of the support system of the present invention.
Figure 5:
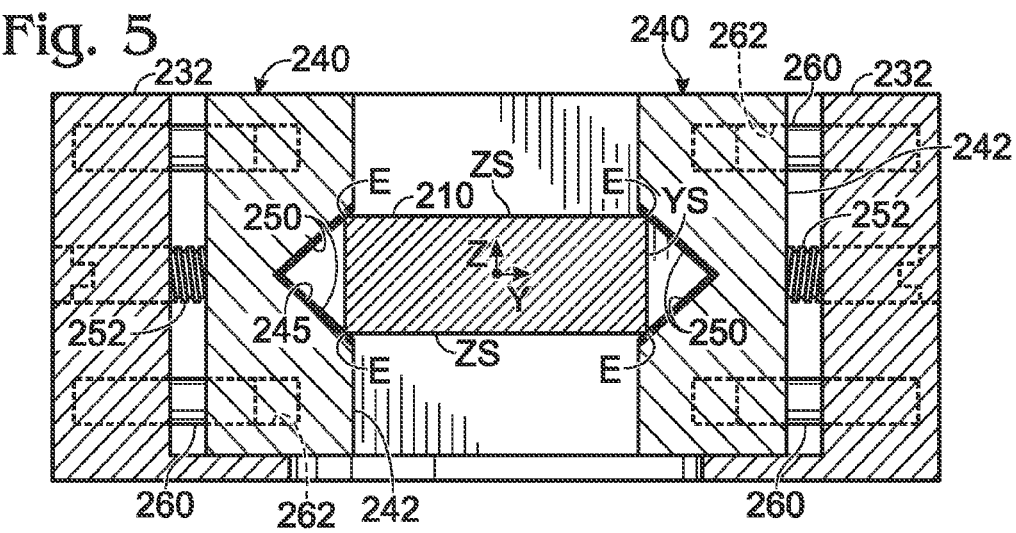
FIG. 5 is an elevation cross sectional view, like FIG. 2 but showing an alternative embodiment of the support system of the present invention.

FIGS. 4 and 5 depict an alternative embodiment of the present invention used to support the optical element 210 of an optical assembly 224. The components of the optical assembly 224 (optical element 210, enclosure 226, leads 222 etc) essentially match those described in connection with the optical assembly 24 of the FIG. 1 embodiment.

In the embodiment of FIGS. 4 and 5, each support member 240 includes a base 242 that includes a central groove 245. The groove 245 is defined by two surfaces 250 that form a 90-degree angle in the base 242. The groove 245 is oriented so that each surface 250 is oblique to the Z surface ZS and to the Y surface YS (those surfaces described above). Preferably, the groove surfaces 250 are inclined 45-degrees from the plane of both the Z- and Y surfaces as shown in FIG. 5.

The surfaces 250 of the grooves provide contact elements that contact the edges "E" of the cuboidal optical element 210 (the edges "E" being described above) when the support members 240 are moved toward the optical element 210. In this regard, support member, hence the contacting surfaces 250 of the grooves, are adjustably positioned relative to the side walls 232 by a drive screw 252 that is threaded into the side wall 232 and has its innermost end rotatably captured in the base 242.

The drive screw 252 is rotatable for advancing or retracting the attached support member 242 toward or away from the optical element 210. The motion of the support members 240 is precisely guided by a pair of guide rods 260 anchored in the sidewall 232 to extend into corresponding guide sleeves 262 formed in the base 242 of the support member 240.

Preferably, the contact surfaces 250 of the groove 245 in the support member are lined with a thin layer of resilient material to protect the edges of the optical element 210 against possible damage arising from the contact between the optical element and the otherwise rigid support members.

In the embodiment depicted in FIGS. 4 and 5 the transducer component 220 may be supported in the same manner as just described in connection with the optical element 210. As an alternative, and as depicted in FIG. 4, the transducer 220 may be secured by fixed-position components including a transducer mount 264 such as a hemispherical, resilient member made from acrylic or the like that is bonded to the surface of the transducer 220. A frame mount 266 is fastened to the side wall 232 adjacent to the transducer mount 264 and includes a central bore into which snugly fits the transducer mount 264 as depicted in FIG. 4. The snugness of the fit secures the transducer 220 in place relative to the enclosure 226, thereby enhancing the overall stability of the assembly 224.

Figure 7:
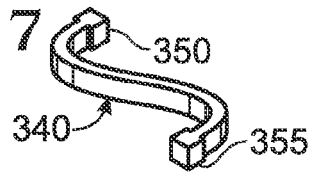
FIG. 7 is a perspective view of a component of the support system embodiment of FIG. 6.
Figure 6:
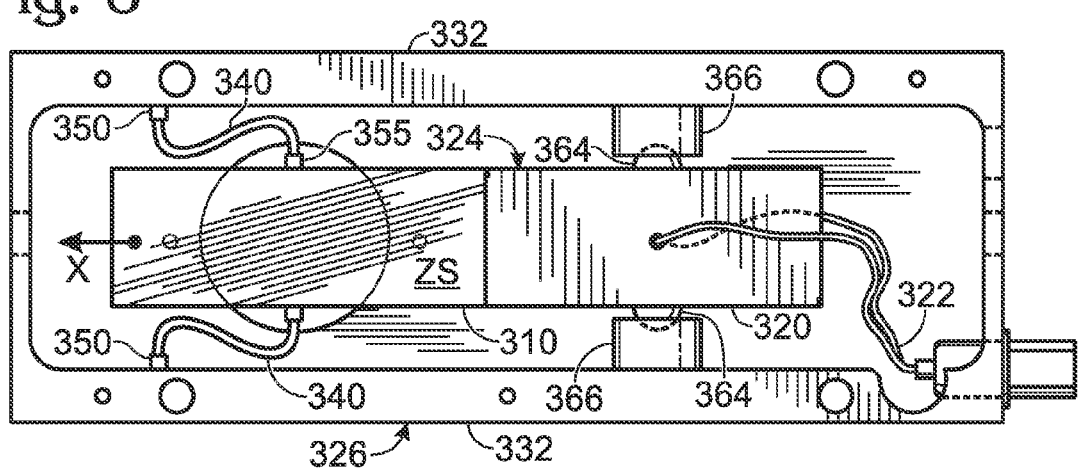
FIG. 6 is a top, plan view showing components of an optical assembly that employs another alternative embodiment of the support system of the present invention.

FIGS. 6 and 7 illustrate another alternative embodiment of the invention for securing the optical assembly 324. The components of the optical assembly 324 (optical element 310, transducer 320, enclosure 326, leads 322 etc) essentially match those described in connection with the optical assembly of the FIG. 1 embodiment.

In the FIGS. 6 and 7 embodiment, the transducer 320 is mounted to the enclosure 326 using transducer mounts 364 and frame mounts 366 that are configured and function as those described above in connection with the embodiment of FIG. 4. The optical element 310 is supported by a pair of curved beams 340. Each beam 340 includes a block-shaped end 355 that is bonded to the optical element 310. The opposite, block-shaped end 350 of the beam 340 is fastened to the side wall 332 of the enclosure.

The support beam 340 is arranged to reside in a support plane that is parallel to the Z surface ZS of the optical element 310. Moreover, the cross section of the support beam 340 (see FIG. 7) is formed so that the depth (measured vertically in FIG. 7) is significantly greater than the width of the beam. As a result, the beam 340 provides significantly greater resistance to bending of the beam out of the support plane as compared to the resistance of the beam to bending within the support plane. The curvature of the beam is such that motion of vibrating optical element 310 in the X-direction is not constrained while, owing to the shape of the beam as just described, the optical element is constrained against movement in the Z-direction.

The embodiments illustrated and described above are not intended to be exhaustive or limit the invention to the precise form disclosed. For example, although the optical elements described above are generally elongated cuboids, it is contemplated the present invention is readily adaptable for optical assemblies that employ octagonal or other shapes of optical elements.

The invention claimed is:

1. A support system for an optical assembly that is adjacent to a frame, comprising:
   an elongated component that vibrates along an X-direction of a three-dimensional Cartesian coordinate system, the X-direction being parallel to a longitudinal axis of the component, the support system including:
   a support member connected to the frame and having contact elements that are adjustable for movement into and out of contact with the vibrating component to constrain motion of the vibrating component in the Y-direction and in the Z-direction, without constraining motion of the vibrating component in the X-direction.

2. The support system of claim 1 wherein the vibrating component is a cuboid and includes two planar, parallel Z surfaces that reside in planes that are perpendicular to the Z-direction, and two planar, parallel Y surfaces that reside in planes that are perpendicular to the Y-direction, the contact elements including Z contact elements for contacting a Z surface of the vibrating component.

3. The support system of claim 2 wherein the contact elements also include Y contact elements for contacting the Y surfaces of the vibrating component.

4. The support system of claim 2 wherein the contact elements include Z contact elements for contacting both Z surfaces of the vibrating component.

5. The support system of claim 3 wherein the support member includes a base into which are movably mounted the contact elements, the contact elements each having a contact end for contacting the vibrating component and an opposing outer end that is configured for engagement by a drive member for selectively advancing and retracting the contact element toward and way from the vibrating component.

6. The support system of claim 5 wherein the contact elements are threaded into the base.

7. The support system of claim 5 wherein the contact end is non-metallic.

8. The support system of claim 1 wherein the contact elements contact the vibrating component without adhesion thereto.

9. The support system of claim 1 wherein the optical assembly includes a transducer connected to the vibrating component, the support system further comprising
transducer supports provided on opposing sides of the transducer, each transducer support including:
a transducer mount adhered to the transducer; and
a frame mount attached to the frame and including a recess therein for receiving the transducer mount; and
wherein the transducer is firmly secured within the frame between the two transducer supports.

10. The support system of claim 1 wherein the vibrating component is cuboidal and includes two planar, parallel Z surfaces that reside in planes that are perpendicular to the Z-direction, and two planar, parallel Y surfaces that reside in planes that are perpendicular to the Y-direction, the contact elements including edge contact elements for contacting edges of the vibrating component that are defined by the junctions of the Z surfaces and Y surfaces.

11. The support system of claim 10 wherein the edge contact elements comprise contact surfaces that are oblique to the Z surfaces and Y surfaces.

12. The support system of claim 11 wherein the contact surfaces include resilient portions that contact the edges of the vibrating component.

13. The support system of claim 10 wherein the contact elements are mounted to the frame for controlled movement toward and away from the vibrating component, thereby to control pressure developed as a result of the contact between the edge contact elements and the edges of the vibrating component.

14. The support system of claim 1 wherein the vibrating component is a photoelastic modulator.

15. A method of supporting a vibrating component of an optical assembly adjacent to a frame, wherein the vibrating component includes a planar surface, the method comprising the steps of:
attaching to the planar surface of the vibrating component a transducer for generating vibration in the vibrating component wherein the vibrating component vibrates in a first linear direction that is perpendicular to the planar surface to which the transducer is attached; and
connecting between the frame and to the vibrating component support members that constrain motion of the vibrating component in second and third linear directions that are perpendicular to one another, and without constraining motion in the first linear direction, wherein the third direction is parallel to the planar surface.

16. The method of claim 15 wherein the support members include contact elements and the connecting step includes mounting the contact elements to be adjustable for movement into and out of contact with the vibrating component.

17. The method of claim 16 including the step of moving the contact elements for contacting edges of the vibrating component that are defined by the junctions of two planar surfaces of the vibrating component.

18. The method of claim 15 including the step of providing a photoelastic modulator as the vibrating component.

19. The method of claim 15 including the steps of:
mounting the support members to be movable into and out of contact with the vibrating component; and
clamping the transducer in place adjacent to the frame.

20. A support member for connection between a vibrating component of an optical assembly and a frame that surrounds that assembly, the support member comprising a curved, elongated beam residing in a support plane that is parallel to the direction of vibration of the vibrating component and that has a cross section that provides significantly greater resistance to bending of the beam out of the support plane as compared to the resistance of the beam to bending in the support plane, the length of the beam being curved to define an "S" shape between opposing ends of the beam.

* * * * *